United States Patent [19]

Eckel et al.

[11] Patent Number: 4,985,493

[45] Date of Patent: Jan. 15, 1991

[54] THERMOPLASTIC MOULDING COMPOUNDS WITH LOW TEMPERATURE TOUGHNESS OBTAINED FROM AROMATIC POLYESTER CARBONATES AND SPECIAL GRAFT POLYMERS

[75] Inventors: Thomas Eckel, Dormagen; Dieter Wittmann, Cologne; Edgar Leitz, Dormagen; Jochen Schoeps, Krefeld; Karl-Heinz Ott; Horst Peters, both of Leverkusen, all of Fed. Rep. of Germany

[73] Assignee: Bayer Aktiengesellschaft, Leverkusen, Fed. Rep. of Germany

[21] Appl. No.: 389,326

[22] Filed: Aug. 3, 1989

[30] Foreign Application Priority Data

Aug. 16, 1988 [DE] Fed. Rep. of Germany ....... 3827642

[51] Int. Cl.$^5$ .................. C08L 69/00; C08L 51/04
[52] U.S. Cl. ...................... 525/67; 525/64; 525/148
[58] Field of Search .............. 525/67, 148, 439, 64, 525/146

[56] References Cited

U.S. PATENT DOCUMENTS

| | | | |
|---|---|---|---|
| 4,522,980 | 6/1985 | Miller | 525/67 |
| 4,677,150 | 6/1987 | Chacko | 525/67 |
| 4,778,853 | 10/1988 | Belfoure | 525/67 |
| 4,804,708 | 2/1989 | Wittman et al. | 525/67 |
| 4,866,123 | 9/1989 | Wittmann | 525/67 |

FOREIGN PATENT DOCUMENTS 135779 4/1985 European Pat. Off. ............. 525/67

*Primary Examiner*—John C. Bleutge
*Assistant Examiner*—David Buttner
*Attorney, Agent, or Firm*—Connolly and Hutz

[57] ABSTRACT

The thermoplastic moulding compounds according to the invention obtained from aromatic polyester carbonates and special graft polymers have a very high weld-line strength as well as a high notched impact strength at room temperature and especially at low temperatures and may be used for the production of moulded articles.

15 Claims, No Drawings

THERMOPLASTIC MOULDING COMPOUNDS WITH LOW TEMPERATURE TOUGHNESS OBTAINED FROM AROMATIC POLYESTER CARBONATES AND SPECIAL GRAFT POLYMERS

This invention relates to thermoplastic moulding compounds based on fully aromatic polyester carbonates and grafted diene rubbers, to a process for their preparation by mixing the components at elevated temperatures and to their use for the production of moulded articles, in particular by injection moulding.

Impact resistant moulding compounds based on fully aromatic polyester carbonates are known.

In Research Disclosure 1982, 217, 146, the impact strength of aromatic polyester carbonates is improved by the addition of modifiers of the ABS type.

Various additives for improving the impact strength are proposed in EP No. 0 119 311, especially grafted acrylate rubbers and olefine-acrylate copolymers. These modifiers are only effective if the proportion of terephthalic acid in the whole ester component is not more than 25%.

Impact resistant moulding compounds obtained from aromatic polyester carbonates and grafted EPDM rubbers are described in EP No. 0 131 188.

Polycarbonates modified for improved impact strength by means of special graft polymers consisting of a graft basis of cross-linked polybutadiene and a graft of methyl methacrylate and n-butyl acrylate are described in DE-OS No. 3 641 990. The products obtained are not only very tough at low temperatures but also have a high weld-line strength.

For many fields of application, especially in the motor vehicle industry, polyester carbonate moulding compounds are required to have not only a high notched impact strength both at room temperature and at low temperatures but also sufficiently high weld line strength to enable relatively large injection moulded parts containing several feed channels to be obtained in sufficiently high quality.

Although aromatic/polyester carbonate moulding compounds prepared with the aid of rubber modifiers based on butadiene rubbers such as the ABS types described in Research Disclosure 1982, 217 146 may be sufficiently tough at room temperature and lower temperatures for numerous applications, their mechanical properties are unsatisfactory when used for large injection moulded parts on account of the insufficient weld line strength. The notched impact strength at room temperature of the moulded parts may be improved by the introduction of methyl methacrylate-grafted acrylate rubbers or EPDM rubbers into aromatic polyester carbonate moulding compounds, but only at the expense of a considerable reduction in the toughness at low temperatures.

It has now been found that mixtures of fully aromatic polyester carbonates and grafted diene rubbers may be worked up into moulding compounds which have a high notched impact strength at room temperature and good notched impact strength at low temperatures as well as a very high weld line strength by using special grafted, particulate diene rubbers. The diene graft rubbers according to the invention have a special graft shell consisting for the most part of methyl methacrylate and to a less extent of at least one acrylic acid ester of a primary or secondary monohydric aliphatic alcohol or of tertiary butanol.

The properties mentioned above are all the more surprising since mixtures of aromatic polyester carbonates have been found in practice to require substantially higher processing temperatures (280° to 320° C.) than the carbonate mixtures described in DE-OS No. 3 641 990 (240° to 260° C.). When the graft polymers according to the invention are used with the polyester carbonates, the advantageous properties of toughness at low temperatures and high weld line strength are preserved even at elevated processing temperatures.

The special graft polymer is thus also distinguished by its improved thermal resistance.

This invention relates to thermoplastic moulding compounds containing

A. from 5-99 parts by weight, preferably from 40-98, especially from 60-97 parts by weight of a fully aromatic polyester carbonate and
B. from 1-60 parts by weight, preferably from 2-50, especially from 3-40 parts by weight of a graft polymer of
  B.1 from 5-90 parts by weight, preferably from 10-70, especially from 15-50 parts by weight of a mixture of
    B.1.1 from 20-99 parts by weight, preferably from 50-97, especially from 70-95 parts by weight, of methyl methacrylate and
    B.1.2 from 1-40 parts by weight, preferably from 1-20 parts by weight, of an acrylic acid ester of a primary or secondary monohydric aliphatic $C_2$-$C_{10}$-alcohol and optionally
    B.1.3 from 0.1 to 10 parts by weight, preferably from 0.5-4 parts by weight, of an acrylic or methacrylic acid ester of tert. butanol and/or
    B.1.4 from 0.1-30 parts by weight preferably from 0.5-20 parts by weight, of a mixture of from 50-95 parts by weight of styrene, $\alpha$-methylstyrene or styrene substituted in the nucleus with $C_1$-$C_4$-alkyl or with halogen, or mixtures thereof, and from 5-50 parts by weight of acrylonitrile, methacrylonitrile maleic acid anhydride, $C_1$-$C_4$-alkyl-substituted or phenyl-N-substituted maleimide or mixtures thereof, in which the sum of the parts by weight of B.1.1 and B.1.2 and, if used, B.1.3 and/or B.1.4 should amount to 100 parts by weight, on
  B.2 from 10-95 parts by weight, preferably from 30-90, especially from 50-85 parts by weight of a cross-linked diene rubber having an average particle diameter $d_{50}$ of from 0.05 to 1 $\mu$m, preferably from 0.05 to 0.8 $\mu$m, especially from 0.05 to 0.6 $\mu$m, and a gel content of more than 50% by weight, preferably more than 70, especially from 73 to 98% by weight, based on the weight of B.2, and optionally
C. from 0.1-50 parts by weight, preferably from 0.5-40, especially from 0.8-30 parts by weight of a thermoplastic vinyl copolymer of
  C.1 from 50-98 parts by weight, preferably from 60-95 parts by weight, of styrene, $\alpha$-methylstyrene, styrene substituted in the nucleus, methyl methacrylate or mixtures thereof and
  C.2 from 50-2 parts by weight, preferably from 40-5 parts by weight, of acrylonitrile, methacrylonitrile, methyl methacrylate, maleic acid anhydride N-substituted maleimide or mixtures thereof, in which the sum of the parts by weight of A and B and, if used, C should amount to 100 parts by weight.

COMPONENT A

Fully aromatic polyester carbonates A in the context of this invention are built up predominantly or entirely of aromatic $C_8$–$C_{14}$-dicarboxylic acids, $C_6$–$C_{20}$-diphenols and carbonic acid derivatives, e.g. phosgene.

The following are examples of preferred aromatic dicarboxylic acids: Isophthalic acid, terephthalic acid diphenylether-4,4'-dicarboxylic acid, naphthalene-2,6-dicarboxylic acids. Iso- and terephthalic acid are particularly preferred. The preferred carbonic acid derivative is phosgene.

Preferred diphenols for the preparation of the fully aromatic polyester carbonates A are compounds corresponding to the following formula:

$$\text{HO-Z-OH} \qquad (I)$$

wherein Z denotes a divalent mononuclear or multinuclear aromatic group containing 6 to 30 carbon atoms and is so constructed that the two OH groups are each directly attached to a carbon atom of an aromatic system.

Compounds corresponding to formula II are particularly preferred diphenols:

wherein
Y denotes a single bond, an alkylene or alkylidene group containing 1–7 carbon atoms, a cycloalkylene or cycloalkylidene group containing 5–12 carbon atoms,

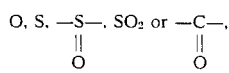

and derivatives thereof which are alkylated or halogenated in the nucleus e.g.
hydroquinone,
resorcinol,
dihydroxydiphenyls,
bis-(hydroxyphenyl)-alkanes,
bis-(hydroxyphenyl)-cycloalkanes,
bis-(hydroxyphenyl)-ethers,
bis-(hydroxyphenyl)-ketones,
bis-(hydroxyphenyl)-sulphoxides,
bis-(hydroxyphenyl)-sulphones and
$\alpha,\alpha'$-bis-(hydroxyphenyl)-diisopropylbenzenes and derivatives thereof which are alkylated or halogenated in the nucleus.

The following are the most important diphenols: Bisphenol-A, tetramethyl bisphenol-A, 1,1-bis-(4-hydroxy-phenyl)-isobutane, 1,1-bis-(4-hydroxyphenyl)-cyclohexane 4,4'-dihydroxydiphenyl sulphide, 4,4'-dihydroxydiphenyl sulphone and the di- and tetrahalogenated derivatives of these compounds. Bisphenol-A is particularly preferred. Any mixtures of the above mentioned diphenols may also be used.

Possible branching agents are mentioned in DE-OS Nos. 2 940 024 and 3 007 934.

The chain terminating agents used for the fully aromatic polyester carbonates A are preferably phenol alkylphenols containing $C_1$–$C_{12}$-alkyl groups, halogenated phenols, hydroxydiphenyl, naphthols, chlorocarbonic acid esters of such phenolic compounds and chlorides of aromatic monocarboxylic acids optionally substituted by $C_1$–$C_{22}$-alkyl groups or by halogen atoms. These chain terminating agents may be used in quantities of from 0.1 to 10 mol-% (based on diphenols in the case of phenols and on acid dichlorides in the case of acid chlorides). The chlorides of aliphatic monocarboxylic acids containing up to 22 carbon atoms may also be used.

For the synthesis of the fully aromatic polyester carbonates A, up to 30 mol-%, preferably up to 20 mol-%, of the aromatic dicarboxylic acids and dihydroxy compounds may be replaced by aliphatic units, e.g. adipic acid or butane-1,4-diol.

The fully aromatic polyester carbonates A may be partly synthesized from aromatic hydroxy carboxylic acids, e.g. p-hydroxybenzoic acid. The proportion of such hydroxycarboxylic acids may be up to 100 mol-% and is preferably from 30 to 50 mol-% (based on the bisphenol).

When both iso- and terephthalic acid are used for the synthesis of the fully aromatic polyester carbonates, the terephthalic acid component may amount to 1 to 99%, preferably 25 to 75% of the total ester component.

The fully aromatic polyester carbonates may contain from 1–99 mol-%, preferably from 30–80 mol-% of ester groups, based on the sum of ester groups and carbonate groups.

Both the ester component and the carbonate component of the fully aromatic polyester carbonates A may be in the form of blocks or randomly distributed in the polycondensate.

The preparation of the fully aromatic polyester carbonates A is known and has been described, for example, in DE-OS Nos. 1 495 626, 2 232 877, 2 703 376, 3 000 610, 2 714 544, 2 940 024 and 3 007 934. The phase interface process is particularly preferred.

The relative solution viscosity ($\eta_{rel}$) of the fully aromatic polyester carbonates A is in the range of from 1.18 to 1.4, preferably from 1.22 to 1.3 (determined on solutions of 0.5 g of polyester carbonate A in 100 ml of $CH_2Cl_2$ solution at 25° C.).

The carbonate group content may be adjusted to the desired value by mixing fully aromatic polyester carbonates with aromatic polycarbonates. This means that component A is in accordance with the invention even if the fully aromatic polyester carbonate is partly replaced, i.e. to an extent of 5 to 95% by weight, preferably from 10 to 50% by weight, by an aromatic polycarbonate. The aromatic polycarbonates used may be homopolycarbonates or copolycarbonates. These are described, for example, in U.S. Pat. Ser. No. 2 999 835, GB-PS No. 772 627 and DE-OS No. 3 334 872.

COMPONENT B

Preferred graft polymers B are those which are obtained by the graft polymerisation of from 5 to 90 parts by weight, preferably from 10 to 70 parts by weight, especially from 15 to 50 parts by weight, of at least one vinyl monomer mixture of methyl methacrylate and an acrylic acid ester of a primary or secondary monohydric aliphatic $C_2$–$C_{10}$-alcohol such as n-butyl acrylate on from 10 to 95 parts by weight, preferably from 30 to 90, especially from 50 to 85 parts by weight of a particulate, cross-linked diene rubber.

In addition, up to 10 parts by weight of the acrylic or methacrylic acid ester of tertiary butanol and/or up to 30 parts by weight of a mixture of styrene or $\alpha$-methylstyrene and acrylonitrile, methacrylonitrile or maleic acid anhydride may be grafted on the graft rubber base.

Mixtures of methyl methacrylate and n-butyl acrylate in proportions of 85:15 to 98:2 and mixtures thereof with t-butylacrylate and/or with styrene and acrylonitrile (ratio 72:28) are particularly preferred graft monomers.

Cross-linked homo- and/or copolymers of conjugated $C_4$–$C_6$-dienes are preferred diene rubbers B.2. Butadiene-1,3 is the preferred diene. In addition to the diene residues, the diene copolymers may contain up to 20% by weight, based on the diene copolymer, of residues of other ethylenically unsaturated monomers incorporated by polymerisation, such as styrene, acrylonitrile or esters of acrylic or methacrylic acid with monohydric $C_1$–$C_4$-alcohols, such as methyl acrylate, ethyl acrylate, methyl methacrylate or ethyl methacrylate.

The preparation of the diene graft base B.2 and of the graft polymers B prepared from them is described, e.g. in "Methoden der organischen Chemie" (Houben-Weyl), Vol. 14/1, Georg Thieme Verlag, Stuttgart 1961, pages 393 to 406, and in "Ullmanns Encyclopädie der technischen Chemie", 4th Edition, Vol. 19, published by Verlag Chemie, Weinheim, 1981, pages 279 to 284.

When graft polymers B are prepared by graft copolymerisation, which is normally carried out in the presence of radical starters, e.g. water-soluble initiators, emulsifiers or complex formers/graft activators as well as regulators, a certain amount of free polymers or copolymers of the graft monomers which form the graft shell is generally formed in addition to the graft copolymer proper.

The graft polymer B in the context of this invention is therefore the product obtained by the polymerisation of graft monomers B.1 in the presence of the diene rubber B.2.

The moulding compounds according to the invention have optimum properties when the quantity of free (co)polymer in the graft polymer B does not exceed 15% by weight and preferably does not exceed 10, especially 7% by weight, based on B.

The Staudinger index of these free (co)polymers should be less than 0.6 dl/g and is preferably less than 0.4 dl/g, determined at 25° C. in dimethylformamide.

The average particle diameter $d_{50}$ is the diameter which is greater than that of 50% by weight of the particles and less than that of the remaining 50% by weight. It may be determined by ultracentrifuge measurements (W. Scholtan, H. Lange, Kolloid.Z. und Z. Polymere 250 (1972), 782-796) or by electron microscopy followed by particle count (G. Kämpf, H. Schuster, Angew. makromolekulare Chemie, 14, (1970), 111-129) or by light scattering measurements.

The gel contents of the cross-linked diene rubbers are determined at 25° C. in toluene (M. Hoffmann, H. Krämer, R. Kuhn, Polymeranalytik I and II, Georg Thieme Verlag, Stuttgart 1977).

Inorganic or organic peroxides or hydroperoxides e.g. compounds of the type $R_1OOR_2$, may be used as radical formers ($R_1 = R_2 =$ alkyl, aryl, acyl, hydrogen $R_1 =$ alkyl, acryl, acyl; $R_2 =$ hydrogen). The total number of carbon atoms in groups $R_1$ and $R_2$ is <30, preferably <25. Examples include peroxides and hydroperoxides such as dibenzoylperoxide, tert.-butyl hydroperoxide, cumene hydroperoxide, lauryl peroxide, 2,5-di-tert.-butyl-2,5dimethylhexylperoxide, di-tert.-butyl peroxide and dicumyl peroxide.

Inorganic compounds containing an O—O group, such as peroxides or per compounds of acids of sulphur, e.g. persulphates, or perborates are also suitable radical formers. Persulphates are preferred, e.g. $K_2S_2O_8$. The following are examples: $(NH_4)_2S_2O_8$, $Na_2O_2$, $NaBO_3.4H_2O$ and $Na_2B_4O_8.10\ H_2O$.

The quantity of peroxide/hydroperoxide compounds used is most preferably from 0.05 to 0.30% by weight.

The graft polymer B prepared as described above may be worked up by known processes, e.g. by coagulation of the latices with electrolytes (salts, acids or mixtures thereof), followed by purification and drying.

COMPONENT C

Preferred vinyl copolymers C are those obtained from at least one monomer selected from styrene, methyl methacrylate α-methylstyrene and/or styrene substituted in the nucleus with at least one monomer selected from acrylonitrile, methacrylonitrile, methyl methacrylate, maleic acid anhydride and/or N-substituted maleimide.

Copolymers C may also be formed as byproducts from the graft polymerisation carried out for the preparation of component B, especially when large quantities of monomers are grafted on small quantities of rubber. The quantity of copolymer to be used according to the invention, amounting to 0.1 to 50 parts by weight, based on 100 parts by weight of A+B+C, does not include these by-products of graft polymerisation.

The copolymers C are resinous, thermoplastic and free from rubber. Particularly preferred copolymers C according to the invention are random copolymers of styrene and maleic acid anhydride preferably prepared from the corresponding monomers by a continuous solvent-free or solution polymerisation with incomplete conversion rates.

The proportions of the two components of the randomly structured styrene/maleic acid anhydride copolymers suitable for this invention may be varied within wide limits. The preferred maleic acid anhydride content is from 5 to 25% by weight, Instead of styrene, the polymers may contain styrenes which are substituted in the nucleus, such as p-methylstyrene, 2,4-dimethylstyrene and other substituted styrenes, such as α-methylstyrene.

The molecular weights (number average Mn) of the statistically structured styrene/maleic acid anhydride copolymers suitable as component C according to the invention may vary over a wide range and are preferably from 60,000 to 200,000. These products preferably have a limiting viscosity of from 0.3 to 0.9 (determined in dimethylformamide at 25° C.; see Hoffmann, Krämer, Kuhn, Polymeranalytik I, Stuttgart 1977, pages 316 et seq).

The moulding compounds according to the invention may also contain the usual quantities of additives conventionally used for fully aromatic polyester carbonates and for graft polymers or vinyl copolymers, such as stabilizers, pigments, mould release agents, flame-retardants and/or antistatic agents.

The moulding compounds according to the invention may be prepared by mixing the components in known manner and melt compounding or melt extruding the mixtures at elevated temperatures, preferably at 200° to 350° C., in conventional apparatus such as internal kneaders, extruders or double shaft screws. The various components may be mixed together successively or simultaneously.

This invention thus also relates to a process for the preparation of thermoplastic moulding compounds containing components A and B and optionally component C and stabilizers, pigments, mould release agents, flame retardants and/or antistatic agents, characterised in that components A and B and optionally component C and stabilizers, pigments, mould release agents, flame retardants and/or antistatic agents are mixed together in known manner and melt compounded or melt extruded at elevated temperatures, preferably at temperatures from 200° to 350° C., in conventional apparatus such as internal kneaders, extruders or double screws.

The moulding compounds according to the invention may be used for the production of moulded articles of all types, e.g. by injection moulding The following are examples of such moulded articles: Housing parts (e.g. for domestic appliances such as juice extractors, coffee machines, mixers and microwave equipment), cover plates for the building industry, and parts of motor vehicles. They are also used for electrical devices such as contact strips, spool bodies and printed circuits.

Moulded articles may also be produced by deep drawing previously produced plates or sheets.

The invention also relates to the use of the above described moulding compounds for the production of moulded articles.

EXAMPLES

The parts given are parts by weight.

A. Fully aromatic polyester carbonate

A 1

Polyester carbonate having an ester content of 50 mol-% based on bisphenol-A and iso- and terephthalic acid (1:1) and containing 3 mol-%, based on the bisphenol-A units, of p-isooctylphenyl end groups and having a relative viscosity $\eta_{rel}$ of 1.30 (determined on a solution of 0.5 g of polyester carbonate in 100 ml of $CH_2Cl_2$ at 25° C.).

A 2

Polyester carbonate having an ester content of 80 mol-% based on bisphenol-A and iso- and terephthalic acid (1:1) containing 3 mol-%, based on the bisphenol-A units, of p-isooctylphenyl end groups and having a relative viscosity $\eta_{rel}$ of 1.30 (determined on a solution of 0.5 g of polyester carbonate in 100 ml of $CH_2Cl_2$ at 25° C.).

A 3

Linear polycarbonate based on bisphenol-A, having a relative solution viscosity $\eta_{rel}$ of from 1.26 to 1.28, determined in $CH_2Cl_2$ at 25° C. and at a concentration of 0.5 g/100 ml.

B. Graft polymer

B 1

Graft polymer prepared by emulsion polymerisation from 80% by weight of a graft base of cross-linked polybutadiene (gel content 85% by weight, determined in toluene) and 20% by weight of a graft of methyl methacrylate and n-butyl acrylate in proportions of 9:1, average particle diameter $d_{50}=0.4$ μm.

B 2 (Comparison)

Graft polymer of 50 parts by weight of a copolymer of styrene and acrylonitrile in proportions of 72:28 on 50 parts by weight of a particulate cross-linked polybutadiene rubber (average particle diameter $d_{50}=0.4$ μm) prepared by emulsion polymerisation.

B 3 (Comparison)

Graft polymer prepared from 80% by weight of a graft base of cross-linked polybutyl acrylate rubber (cross-linking agent: butylene diacrylate and allyl methacrylate) and 20% by weight of a graft of methyl methacrylate, obtainable from Rohm and Haas under the Trade name Acryloid KM-330.

C. Vinyl copolymer

Styrene/maleic acid anhydride copolymer having a maleic acid anhydride content of 8% from Arco Polymers, Inc. (Type Dylark 232) L-value 1.7 g/10 min and weight average molecular weight of about 135,000 g/mol.

PREPARATION AND TESTING OF THE MOULDING COMPOUNDS ACCORDING TO THE INVENTION

Components A and B and optionally C were melted at 200° to 300° C. on a 3 l internal kneader and homogenised.

Rods measuring 80×10×4 mm (operating temperature 280° C.) are produced from the moulding compounds in an injection moulding machine and used for determining the notched impact strength (by the method of ISO 180) at room temperature, 0° C., −20° C., −40° C. and −60° C.

The results were used to determine the transition from tough to brittle, i.e. the temperatures at which the first brittleness fractures occur.

The weld line strength was determined from the impact strength according to DIN 53 452 (Charpy method) at the connecting seam of test samples (processing temperature 280° C.) measuring 170×10×4 mm which had been moulded from two sides.

The moulding compound of fully aromatic polyester carbonate according to the invention (ester content: 50 mol-%) and graft polymer (Experiment 3) is found to have a substantially greater weld line strength and higher notched impact strength at low temperatures than the styrene/acrylonitrile grafted rubber (Comparison Example 1) at the same rubber content. The tough/brittle transition is also shifted to low temperatures, i.e. the moulding compound according to the invention is still tough under breakage conditions at much lower temperatures.

Compared with Comparison Example 2, an acrylate rubber grafted with methyl methacrylate, the moulding compound according to the invention has a substantially improved toughness at low temperatures and weld line strength.

The advantageous properties of the moulding compounds according to the invention are fully preserved even when part of the fully aromatic polyester carbonate is replaced by polycarbonate (Experiments 4 and 5).

Even when minor quantities of a vinyl copolymer are added according to the invention, the moulding compounds obtained have excellent notched impact strength values at low temperatures for a given rubber content and ratio of polyester carbonate to polycarbonate, and they have a substantially higher weld line strength than Comparison Example 6. A comparison between Examples 8 and 9 (with constant ratio of fully aromatic polyester carbonate to polycarbonate) clearly shows that the addition of vinyl copolymer C raises the notched impact strength at −20° C.

The same tendency although at a lower level of notched impact strength is also found in mixtures with a polyester carbonate which has an ester content of 80 mol-% (experiments 10 to 15).

Table: Composition and properties of moulding compounds

| Example | A1 | A2 | A3 | B1 | B2 | B3 | C | Weld line strength $a_nF$ kJ/m² | Notched impact strength $a_k$ at RT (−20° C) kJ/m² | Tough/brittle transition (° C) |
|---|---|---|---|---|---|---|---|---|---|---|
| 1 (Comparison) | 85 | — | — | — | 15 | — | — | 47.8 | 32.0 (27.2) | −30/−40 |
| 2 (Comparison) | 90 | — | — | — | — | 10 | — | 7.1 | 44.0 (28.0) | −20/−30 |
| 3 | 90 | — | — | 10 | — | — | — | 69.2 | 42.7 (41.0) | −40/−50 |
| 4 | 72 | — | 18 | 10 | — | — | — | 76.2 | 46.0 (41.7) | −40/−50 |
| 5 | 60 | — | 30 | 10 | — | — | — | 83.0 | 47.7 (43.6) | −50 |
| 6 (Comparison) | 60 | — | 15 | — | 15 | — | 10 | 2.7 | 65.5 (40.9) | −20/−30 |
| 7 (Comparison) | 64 | — | 16 | — | 15 | — | 5 | 6.1 | 52.0 (37.0) | −30 |
| 8 | 64 | — | 16 | 10 | — | — | 10 | 4.7 | 50.9 (44.2) | −30/−40 |
| 9 | 68 | — | 17 | 10 | — | — | 5 | 14.3 | 48.1 (42.6) | /−40 |
| 10 (Comparison) | — | 90 | — | — | — | 10 | — | 14.0 | 27.1 (17.0) | 0 |
| 11 | — | 93.75 | — | 6.25 | — | — | — | 77.1 | 34.0 (20.6) | −10 |
| 12 | — | 87.5 | — | 12.5 | — | — | — | 64.2 | 31.0 (22.8) | −10/−20 |
| 13 | — | 85 | — | 15 | — | — | — | 39.7 | 30.9 (24.2) | −10/−20 |
| 14 | — | 68 | 17 | 15 | — | — | — | 50.3 | 31.4 (32.3) | −20/−30 |
| 15 | — | 56.6 | 28.3 | 15 | — | — | — | 61.9 | 35.2 (35.1) | −30/−40 |

We claim:

1. Thermoplastic moulding compounds consisting essentially of
   A. from 5–99 parts by weight of a fully aromatic polyester carbonate and
   B. from 1–60 parts by weight of a graft polymer of
      B.1 from 5–90 parts by weight of a mixture of
         B.1.1 from 20–99 parts by weight of methyl methacrylate and
         B.1.2 from 1–40 parts by weight of an acrylic acid ester of a primary or secondary monohydric aliphatic $C_2$–$C_{10}$ alcohol in which the sum of the parts by weight of B.1.1 and B.1.2 amounts to 100 parts by weight, on
      B.2 from 10–95 parts by weight of a cross-linked diene rubber having an average particle diameter $d_{50}$ of from 0.05 to 1 μm and a gel content of more than 50% by weight, based on the weight of B.2
   in which the sum of the parts by weight of A and B is 100.

2. Thermoplastic moulding compounds consisting essentially of
   A. from 5–99 parts by weight of a fully aromatic polyester carbonate and
   B. from 1–60 parts by weight of a graft polymer of
      B.1 from 5–90 parts by weight of a mixture of
         B.1.1 from 20–99 parts by weight of methyl methacrylate and
         B.1.2 from 1–40 parts by weight of an acrylic acid ester of a primary or secondary monohydric aliphatic $C_2$–$C_{10}$ alcohol and
         B.1.3 from 0.1–10 parts by weight of an acrylic or methacrylic acid ester of tert.-butanol or
         B.1.4 from 0.1–30 parts by weight of a mixture of from 50–95 parts by weight of styrene, α-methylstyrene, styrene substituted in the nucleus by $C_1$–$C_4$-alkyl or by halogen, or mixtures thereof, and from 5–50 parts by weight of acrylonitrile, methacrylonitrile, maleic acid anhydride or $C_1$–$C_4$-alkyl-substituted or phenyl-N-substituted maleimide or mixtures thereof, or mixtures of B.1.3 and B.1.4 in which the sum of the parts by weight of B.1.1 and B.1.2 and B.1.3 or B.1.4 or the mixture thereof amounts to 100 parts by weight, on
      B.2 from 10–95 parts by weight of a cross-linked diene rubber having an average particle diameter $d_{50}$ of from 0.05 to 1 μm and a gel content of more than 50% by weight, based on the weight of B.2 and
   C. from 0.1–50 parts by weight of a thermoplastic vinyl copolymer of
      C.1 from 50–98 parts by weight of styrene, μ-methylstyrene, styrene substituted in the nucleus, methyl methacrylate or mixtures thereof and
      C.2 from 50–2 parts by weight of acrylonitrile, methacrylonitrile, methyl methacrylate, maleic acid anhydride, N-substituted maleimide or mixtures thereof, in which the sum of the parts by weight of A and B and C is 100.

3. Moulding compounds according to claim 2, containing from 40–98 parts by weight of component A and from 2–50 parts by weight of component B.

4. Moulding compounds according to claim 2, characterized in that the graft polymer B is prepared from 10–70 parts by weight of graft monomers B.1 and 30–50 parts by weight of diene rubber B.2.

5. Moulding compounds according to claim 2, characterized in that component B.1 consists of from 50–97 parts by weight of B.1.1 and from 1–20 parts by weight of B.1.2.

6. Moulding compounds according to claim 2, characterized in that the particle diameters of the diene rubbers B.2 are from 0.05 to 0.8 μm.

7. Moulding compounds according to claim 2, characterized in that the gel content of the diene rubber B.2 is greater than 70% by weight, based on B.2.

8. Process for the preparation of the moulding compounds of claim 2, characterized in that components A and B and component C and stabilizers, pigments, mould release agents, flame retardants or antistatic agents or mixtures thereof are mixed together in known manner and melt compounded or melt extruded at elevated temperature in conventional apparatus.

9. Thermoplastic moulding compounds consisting essentially of
   A. from 5–99 parts by weight of a fully aromatic polyester carbonate and
   B. from 1–60 parts by weight of a graft polymer of
      B.1 from 5–90 parts by weight of a mixture of
         B.1.1 from 20–99 parts by weight of methyl methacrylate and
         B.1.2 from 1–40 parts by weight of an acrylic acid ester of a primary or secondary monohydric aliphatic $C_2$–$C_{10}$ alcohol and
         B.1.3 from 0.1–10 parts by weight of an acrylic or methacrylic acid ester of tert.-butanol or B.1.4 from 0.1–30 parts by weight of a mixture of from 50–95 parts by weight of styrene, α-methylstyrene, styrene substituted in the nucleus by $C_1$–$C_4$-alkyl or by halogen, or mixtures thereof, and from 5–50 parts by weight of acrylonitrile, methacrylonitrile, maleic acid anhydride or $C_1$–$C_4$-alkyl-substituted or phenyl-N-substituted maleimide or mixtures thereof, or mixtures of B.1.3 and B.1.4 in which the sum of the parts by weight of B.1.1, B.1.2 and B.1.3 or B.1.4 or the mixture thereof amounts to 100 parts by weight, on B.2 from 10–95 parts by weight of a cross-linked diene rubber having an average particle diameter $d_{50}$ of from 0.05 to 1 μm and a gel content of more than 50% by weight, based on the weight of B.2 in which the sum of the parts by weight of A and B is 100.

10. Process for the preparation of the moulding compounds of claim 9 characterized in that components A and B and stabilizers, pigments, mould release agents, flame retardants or antistatic agents or mixtures thereof are mixed together in known manner and melt compounded or melt extruded at elevated temperature in conventional apparatus.

11. Moulding compounds according to claim 9, containing from 40–98 party by weight of component A and from 2–50 parts by weight of component B.

12. Moulding compounds according to claim 9, characterized in that the graft polymer B is prepared from 10–70 parts by weight of graft monomers B.1 and 30–50 parts by weight of diene rubber B.2.

13. Moulding compounds according to claim 9, characterized in that component B.1 consists of from 50–90 parts by weight of B.1.1 and from 1–20 parts by weight of B.1.2.

14. Moulding compounds according to claim 9, characterized in that the particle diameters of the diene rubbers B.2 are from 0.05 to 0.8 μm.

15. Moulding compounds according to claim 9, characterized in that the gel content of the diene rubber B.2 is greater than 70% by weight, based on B.2.

* * * * *